United States Patent
Ozyurt et al.

(10) Patent No.: US 12,476,726 B2
(45) Date of Patent: Nov. 18, 2025

(54) TECHNIQUE FOR PERFORMING TIME SYNCHRONIZATION

(71) Applicant: Telefonaktiebolaget LM Ericsson (publ), Stockholm (SE)

(72) Inventors: Ahmet Burak Ozyurt, Edinburgh (GB); Yekta Turk, Ankara (TR); Athanasios Stavridis, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 18/039,448

(22) PCT Filed: Mar. 9, 2021

(86) PCT No.: PCT/EP2021/055840
§ 371 (c)(1),
(2) Date: May 30, 2023

(87) PCT Pub. No.: WO2022/117234
PCT Pub. Date: Jun. 9, 2022

(65) Prior Publication Data
US 2024/0007213 A1    Jan. 4, 2024

(51) Int. Cl.
*H04J 3/06* (2006.01)
*H04B 10/112* (2013.01)

(52) U.S. Cl.
CPC .......... *H04J 3/0661* (2013.01); *H04B 10/112* (2013.01); *H04J 3/0644* (2013.01)

(58) Field of Classification Search
CPC ...... H04J 3/0635; H04J 3/0661; H04J 3/0644; H04J 3/0667; H04B 10/112; H04B 10/1129
See application file for complete search history.

(56) References Cited

U.S. PATENT DOCUMENTS

| | | | |
|---|---|---|---|
| 8,750,412 B2* | 6/2014 | Lin | H04W 4/38 375/296 |
| 8,879,922 B2* | 11/2014 | Liu | H04B 10/616 398/205 |

(Continued)

FOREIGN PATENT DOCUMENTS

| | | |
|---|---|---|
| WO | 2013072826 A1 | 5/2013 |
| WO | 2017040727 A1 | 3/2017 |

OTHER PUBLICATIONS

"ETSI TS 123 501 V16.6.0", 5G; System architecture for the 5G System (5GS) (3GPP TS 23.501 version 16.6.0 Release 16), Oct. 2020, 1-450.

(Continued)

*Primary Examiner* — Bailor C Hsu
(74) *Attorney, Agent, or Firm* — Murphy, Bilak & Homiller, PLLC

(57) ABSTRACT

A technique for performing time synchronization between a master device and a slave device is disclosed. A method implementation of the technique is performed by the master device and comprises transmitting, using optical wireless signals, a timestamp representative of a clock time of the master device to the slave device, wherein the timestamp is encoded using a color-based optical coding scheme and is to be used by the slave device to set a clock time of the slave device in accordance with the timestamp to thereby synchronize the clock time of the slave device with the clock time of the master device.

20 Claims, 13 Drawing Sheets

Transmit, using optical wireless signals, a timestamp representative of a clock time of the master device to a slave device, wherein the timestamp is encoded using a color-based optical coding scheme and is to be used by the slave device to set a clock time of the slave device in accordance with the timestamp to thereby synchronize the clock time of the slave device with the clock time of the master device — S302

(56) References Cited

U.S. PATENT DOCUMENTS

| | | | | |
|---|---|---|---|---|
| 8,909,064 | B2* | 12/2014 | Koley | H04J 14/06 |
| | | | | 398/154 |
| 9,577,702 | B2* | 2/2017 | Seller | H04J 3/0667 |
| 9,615,258 | B2* | 4/2017 | Chen | H04L 63/164 |
| 9,805,296 | B2* | 10/2017 | Loy | G06K 19/06037 |
| 9,984,354 | B1* | 5/2018 | Chinoy | H04N 23/90 |
| 10,652,659 | B2* | 5/2020 | Bhalla | H04R 3/12 |
| 10,680,711 | B2* | 6/2020 | Darabi | H04B 10/85 |
| 10,834,179 | B2* | 11/2020 | Qiu | H04L 67/1004 |
| 11,002,764 | B2* | 5/2021 | Knierim | H03L 7/08 |
| 11,316,912 | B2* | 4/2022 | Lapointe | H04L 65/65 |
| 2014/0114456 | A1* | 4/2014 | Stavropoulos | H04H 60/40 |
| | | | | 700/94 |
| 2019/0059066 | A1 | 2/2019 | Harmatos et al. | |
| 2023/0029041 | A1* | 1/2023 | Earl | H04J 3/0697 |
| 2023/0297816 | A1* | 9/2023 | Karunaratne | G06N 3/065 |
| | | | | 706/15 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.6.0, Sep. 2020, 1-447.

Bian, Rui, et al., "15.73 GB/s Visible Light Communication With Off-the-Shelf LEDs", Journal of Lightwave Technology, vol. 37, No. 10, May 15, 2019, 2418-2424.

IEEE Computer Society, "IEEE Std 802.11aq™-2018", IEEE Standard for Information technology—Telecommunications and information exchange between systems Local and metropolitan area networks—Specific requirements;, 2018, 1-69.

IEEE Instrumentation and Measurement Society, "IEEE Standard for a Precision Clock Synchronization Protocol for Networked Measurement and Control Systems", IEEE Std 1588™-2019 (Revision of IEEE Std 1588-2008), 2019, 1-499.

Karunatilaka, Dilukshan, et al., "LED Based Indoor Visible Light Communications: State of the Art", IEEE Communication Surveys & Tutorials, vol. 17, No. 3, Third Quarter, 2015, 1-30.

Kesuma, Hendra, et al., "Time Synchronization/Stamping Method with Visible Light Communication and Energy Harvesting Methods for Wireless Sensor Network Inside Ariane 5 Vehicle Equipment Bay", Proceedings of Data Systems in Aerospace, Tallinn, Estonia, May 2016, 1-5.

Mahmood, Aamir, et al., "Time Synchronization in 5G Wireless Edge: Requirements and Solutions for Critical-MTC", arXiv:1906.06380v1 [cs.IT], https://www.researchgate.net/publication/333842214, Jun. 2019, 1-8.

Meier, Sven, "Wireless IEEE1588 over an Infrared Interface", 2016 IEEE International Symposium on Precision Clock Synchronization for Measurement, Control, and Communication, 2016, 1-6.

Mendes Matheus, Luiz Eduardo, et al., "Visible Light Communication: Concepts, Applications and Challenges", IEEE Communications Surveys & Tutorials, vol. 21, No. 4, Fourth Quarter, 2019, 3204-3237.

* cited by examiner

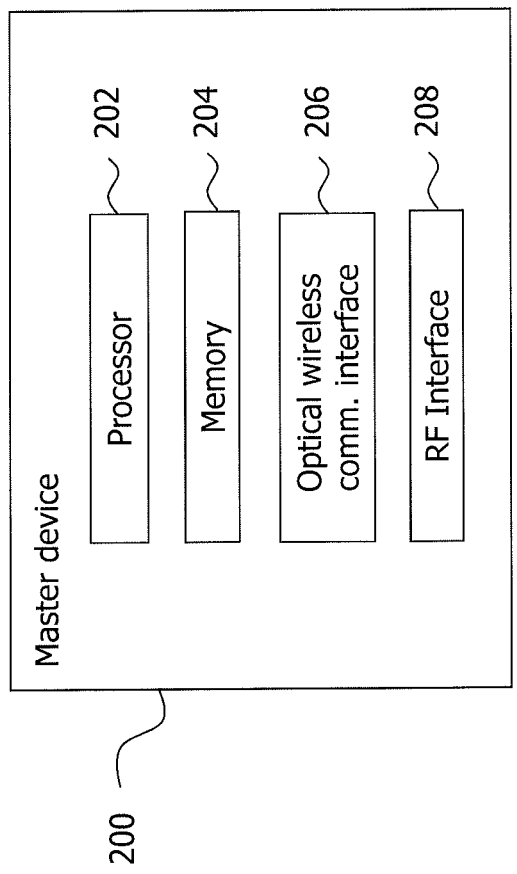
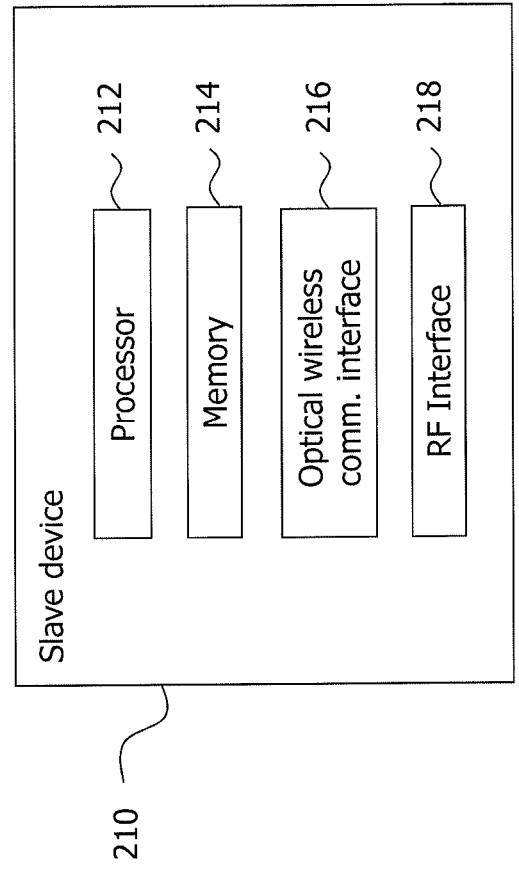
Fig. 2a
Fig. 2b

Fig. 3

S302 — Transmit, using optical wireless signals, a timestamp representative of a clock time of the master device to a slave device, wherein the timestamp is encoded using a color-based optical coding scheme and is to be used by the slave device to set a clock time of the slave device in accordance with the timestamp to thereby synchronize the clock time of the slave device with the clock time of the master device

| Color name | RGB triplet |
|---|---|
| Red | (255, 0, 0) |
| Lime | (0, 255, 0) |
| Blue | (0, 0, 255) |
| White | (255, 255, 255) |
| Fuchsia | (255, 0, 255) |
| Yellow | (255, 255, 0) |
| Aqua | (0, 255, 255) |
| Silver | (192, 192, 192) |

Fig. 5

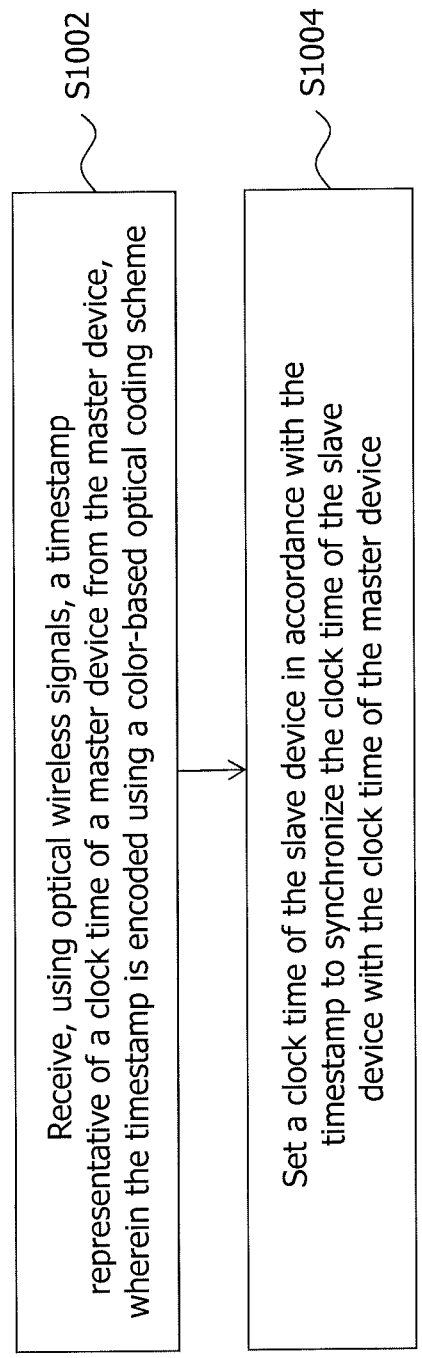

TECHNIQUE FOR PERFORMING TIME SYNCHRONIZATION

TECHNICAL FIELD

The present disclosure generally relates to the field of time synchronization. In particular, a technique for performing time synchronization between a master device and a slave device is provided. The technique may be embodied in methods, computer programs, apparatuses and systems.

BACKGROUND

In recent years, accurate wireless time synchronization via the exchange of timestamps between nodes has gained significant attention, especially with the advent of the industrial 4.0 paradigm (also known as the Fourth Industrial Revolution). As an example, the IEEE 1588 Standard for a Precision Clock Synchronization Protocol defines a set of periodic message exchange used to capture the propagation delay of a network and calculate the time offsets between master and slave ports that are geographically distributed across the nodes. A common terminology for synchronization protocols includes the terms master node (or "device") and slave node (or "device"). A master node is a node which broadcasts its clock using timestamps, whereas a slave node is a node which aligns its clock to the master node.

According to the IEEE 1588 Standard, assuming a master node which broadcasts timestamps and a number of slave nodes aiming to synchronize their clocks to the clock of the master node, the operation is as follows. The master node transmits a Sync message to the existing slave nodes at time $t_1$, which is the timestamp of its own clock. Considering only one of the slave nodes for simplicity, the Sync message is received by the slave node at time $t_2$, which is likewise the timestamp of its own clock. The difference between $t_2$ and $t_1$ is the clock offset, including any propagation delay between the master and slave node. The slave node then sends a Delay_Req message to the master node, which is transmitted at time $t_3$, as measured by the slave node's clock, and received by the master node at time $t_4$, as measured by the master node's clock. A Delay_Req message is a request for the receiving node to return the time at which the Delay_Req message was received, using a Delay_Resp message.

In the next step, the master node transmits a Delay_Resp message to the slave node with all necessary timestamps. The Delay_Resp message is generally used to measure the link delay between two clock ports implementing the peer delay mechanism. Based on the Delay_Resp message, the slave node can thus finally determine the master node-slave node clock offset and propagation delay of the network and use this value to align its time clock to the master node time clock. The propagation delay of the network is generally calculated based on the assumption that the two directions (forward M→S and reverse S→M) are symmetric. If the network is not symmetric, a time error will be produced. The magnitude of the error will be proportional to half the difference in the delay between the forward and reverse directions.

Without time synchronization, different nodes may not be able to cooperate concurrently in a coordinated manner resulting in machine production line disruptions, for example. Distribution of an accurate time reference is especially important for time-critical Machine-Type Communication (MTC), such as Industrial Internet of Things (IIoT), factory automation, power distribution, and vehicular communication, for example.

Typically, time synchronization is undertaken separately from information transfer in industrial telecommunication systems, and timing distribution is generally performed on licensed radio frequency (RF) spectrum. One option is to base the reference source of time for master node's clock on the Global Positioning System (GPS) as received from GPS satellites (there are also other time source satellites systems such as GLONASS, BAIDU, GALILEO, and the like). Such scenario is exemplified in FIG. 1, which illustrates a master clock 102 maintained in a core network 104 of a telecommunication system, wherein the master clock 102 uses a GPS satellite 106 as time source and wherein slave clocks 108a-c in the system try to align with the master clock 102. Such approach is impractical for indoor deployments, however. An alternative approach is to provide an atomic clock separately in the infrastructure of a Mobile Network Operator (MNO) as a source of time, for example. However, atomic clock solutions are expensive and are likewise impractical for indoor industrial deployments.

When RF-based time synchronization is used, accuracy may be degraded due to inaccurate estimation of propagation delay, poor coverage, bandwidth limitation and random jitter in the transmitter. In addition, time synchronization using RF signals may be prone to external jamming. The time synchronization period generally depends on the frequency and phase stability of the onboard oscillators in existing devices which can cause clock skew and drift. The main disrupting factors to synchronization accuracy thus include (1) base station related: time alignment errors (TAEs), timestamping-to-transmission delays and time-stamping granularities, (2) channel related: propagation time and its variations (jitter), asymmetry in uplink/downlink propagation and scheduling/medium access delays, and (3) device related: time adjustment errors at the device and additional delays, such as delays caused in user authentication processes, for example.

It may thus be summarized that wireless time synchronization generally involves RF transmission of time synchronization reference signals from a master node towards one or more slave nodes, usually including an absolute time reference. Even though widely used for time synchronization in practice, the RF-based approach generally has disadvantages which include the following:

In densely cluttered environments, the true time-of-arrival (TOA) may be perturbed by both the measurement noise and line-of-sight (LoS)/non-LoS (NLoS) multipath error. In LoS multipath environments, multipath signals tend to arrive close to the direct path. The signals combine to create a cluster in the power delay profile, making it challenging to extract the TOA of the direct path. As a result, depending on the structure of the propagation environment, TOA estimation from timing advance (TA) may lead to varying synchronization errors.

The direct time synchronization using GPS signals may not work in indoor environments when the master nodes are located away from a window with limited or no view of the sky and/or located inside a building. This is because GPS signals are usually significantly degraded by walls. Although GPS has many benefits, some MNOs seek to minimize the use of GPS within their network, especially at the base station sites, which is generally driven by the fact that the number of base stations to be deployed is expected to significantly increase in the coming years, as well as by the need to use alternative methods to transfer time through the network.

The clock synchronization in the network may require significant bandwidth, i.e., impose a significant signaling overhead in the network, wherein the synchronization data needs to be propagated throughout the network in a deterministic fashion. Hence, the synchronization traffic interferes with the scheduled and regular traffic.

Time synchronization using RF may inherently be problematic when there is external jamming. In general, small cell RF nodes are physically more exposed, thereby allowing more opportunities for attackers to disrupt the synchronization of the network. Although security-related protocols, like Internet Protocol Security (IPsec), are expected to be used by small base stations, this may not be possible for packet-based synchronization solutions due to additional delays and potentially related impairments.

Deployment of low-cost low-power base stations as a general strategy may imply a corresponding strategy of deploying a comparably low-cost synchronization solution. The implementation cost of RF-based architecture can be high for some use cases. The front-end components, both transmitters and receivers, require frequency mixers or sophisticated algorithms for the correction of hardware impairments, such as phase noise and IQ imbalance. This means that higher-cost solutions, e.g., involving locally placed time servers, may not always be an option.

SUMMARY

Accordingly, there is a need for a technique which allows performing time synchronization between a master device and a slave device in a robust and resource-efficient manner, and particularly avoiding one or more of the problems discussed above.

According to a first aspect, a method for performing time synchronization between a master device and a slave device is provided. The method is performed by the master device and comprises transmitting, using optical wireless signals, a timestamp representative of a clock time of the master device to the slave device. The timestamp is encoded using a color-based optical coding scheme and is to be used by the slave device to set a clock time of the slave device in accordance with the timestamp to thereby synchronize the clock time of the slave device with the clock time of the master device.

The optical wireless signals may be transmitted as part of light communication (LC) and, optionally, as part of at least one of infrared, ultraviolet and visible light communication (VLC). The clock time of the master device may be time-synchronized with a master clock. At least one of the master device and the slave device may be a radio network node of a wireless communication system.

The color-based optical coding scheme may correspond to an optical wireless communication specific modulation scheme. The optical wireless communication specific modulation scheme may include at least one of color intensity modulation (CIM), color-shift keying (CSK), metameric modulation (MM), pulse amplitude modulation (PAM), and optical orthogonal frequency division multiplexing (OFDM). Alternatively, the color-based optical coding scheme may be implemented using a predefined color codebook according to which different timestamps are encoded by different shades of color. In the color codebook, each shade of color may be defined by a predefined number of color components, each being defined by a predefined number of bits representative of a value of the respective color component. The predefined number of color components and the predefined number of bits may be defined in accordance with a Red Green Blue (RGB) color representation scheme.

Color components having a higher signal-to-noise ratio (SNR) in the optical wireless signals than other color components among the predefined number of color components may be assigned more bits of the predefined number of bits than the other color components. The predefined number of bits of the predefined number of color components may be interpreted as a numerical value and timestamps may be defined in accordance with a minimum time unit. Increments on a level of the minimum time unit may then be encoded by increments of the numerical value.

The color codebook may comprise a code for indicating a start of a new time unit. The new time unit may be one of a second, a minute, an hour, and a day. In a color spectrum of the color codebook, at least some portions of the color spectrum between adjacent codes represented by the shades of color may not be used for timestamp encoding.

The timestamp may be adjusted by a delay offset before transmitting the timestamp to the slave device. Alternatively, the timestamp may be to be adjusted by the slave device by a delay offset after reception of the timestamp. The delay offset may account for a propagation delay observed between the master device and the slave device. The delay offset may be determined as half of a round-trip time (RTT) observed in the optical wireless signals transmitted between the master device and the slave device.

According to a second aspect, a method for performing time synchronization between a master device and a slave device is provided. The method is performed by the slave device and comprises receiving, using optical wireless signals, a timestamp representative of a clock time of the master device from the master device. The timestamp may be encoded using a color-based optical coding scheme. The method further comprises setting a clock time of the slave device in accordance with the timestamp to synchronize the clock time of the slave device with the clock time of the master device.

The method according to the second aspect defines a method from the perspective of a slave device which may be complementary to the method performed by the master device according to the first aspect. The slave device and the master device of the second aspect may thus correspond to the slave device and the master device described above in relation to the first aspect.

As in the method of the first aspect, the optical wireless signals may be transmitted as part of LC and, optionally, as part of at least one of infrared, ultraviolet and visible light communication (VLC). The clock time of the master device may be time-synchronized with a master clock. At least one of the master device and the slave device may be a radio network node of a wireless communication system.

The color-based optical coding scheme may correspond to an optical wireless communication specific modulation scheme. The optical wireless communication specific modulation scheme may include at least one of CIM, CSK, MM, PAM, and optical OFDM. Alternatively, the color-based optical coding scheme may be implemented using a predefined color codebook according to which different timestamps are encoded by different shades of color. In the color codebook, each shade of color may be defined by a predefined number of color components, each being defined by a predefined number of bits representative of a value of the respective color component. The predefined number of color components and the predefined number of bits may be defined in accordance with an RGB color representation scheme.

Color components having a higher SNR in the optical wireless signals than other color components among the predefined number of color components may be assigned more bits of the predefined number of bits than the other color components. The predefined number of bits of the predefined number of color components may be interpreted as a numerical value and timestamps may be defined in accordance with a minimum time unit. Increments on a level of the minimum time unit may be encoded by increments of the numerical value.

The color codebook may comprise a code for indicating a start of a new time unit. The new time unit may be one of a second, a minute, an hour, and a day. In a color spectrum of the color codebook, at least some portions of the color spectrum between adjacent codes represented by the shades of color may not be used for timestamp encoding.

The timestamp may be adjusted by the master device by a delay offset before transmitting the timestamp to the slave device. Alternatively, the timestamp may be adjusted by the slave device by a delay offset after reception of the timestamp. The delay offset may account for a propagation delay observed between the master device and the slave device. The delay offset may correspond to half of an RTT observed in the optical wireless signals transmitted between the master device and the slave device.

According to a third aspect, a computer program product is provided. The computer program product comprises program code portions for performing the method of at least one of the first aspect and the second aspect when the computer program product is executed on one or more computing devices, such as the master device and the slave device described herein. The computer program product may be stored on a computer readable recording medium, such as a semiconductor memory, DVD, CD-ROM, and so on.

According to a fourth aspect, a master device for performing time synchronization between the master device and a slave device is provided. The master device comprises processing means configured to transmit, using optical wireless signals, a timestamp representative of a clock time of the master device to the slave device. The timestamp is encoded using a color-based optical coding scheme and is to be used by the slave device to set a clock time of the slave device in accordance with the timestamp to thereby synchronize the clock time of the slave device with the clock time of the master device.

The master device may be configured to perform any of the method steps presented herein with respect to the first aspect. The processing means may comprise at least one processor and at least one memory, wherein the at least one memory contains instructions executable by the at least one processor such that the processing means are operable to perform the method steps presented herein with respect to the first aspect.

According to a fifth aspect, a slave device for performing time synchronization between a master device and the slave device is provided. The slave device comprises processing means configured to receive, using optical wireless signals, a timestamp representative of a clock time of the master device from the master device. The timestamp is encoded using a color-based optical coding scheme. The processing means are further configured to set a clock time of the slave device in accordance with the timestamp to synchronize the clock time of the slave device with the clock time of the master device.

The slave device may be configured to perform any of the method steps presented herein with respect to the second aspect. The processing means may comprise at least one processor and at least one memory, wherein the at least one memory contains instructions executable by the at least one processor such that the processing means are operable to perform the method steps presented herein with respect to the second aspect.

According to a sixth aspect, there is provided a system comprising a master device according to the fourth aspect and a slave device according to the fifth aspect.

BRIEF DESCRIPTION OF THE DRAWINGS

Implementations of the technique presented herein are described herein below with reference to the accompanying drawings, in which:

FIGS. 2a and 2b illustrate exemplary embodiments of a master device and a slave device according to the present disclosure;

FIG. 3 illustrates an exemplary method embodiment for performing time synchronization by the master device according to the present disclosure;

FIG. 5 illustrates exemplary shades of color obtained by different RGB values;

FIG. 10 illustrates an exemplary method embodiment for performing time synchronization by the slave device according to the present disclosure;

DETAILED DESCRIPTION

Figure 1:
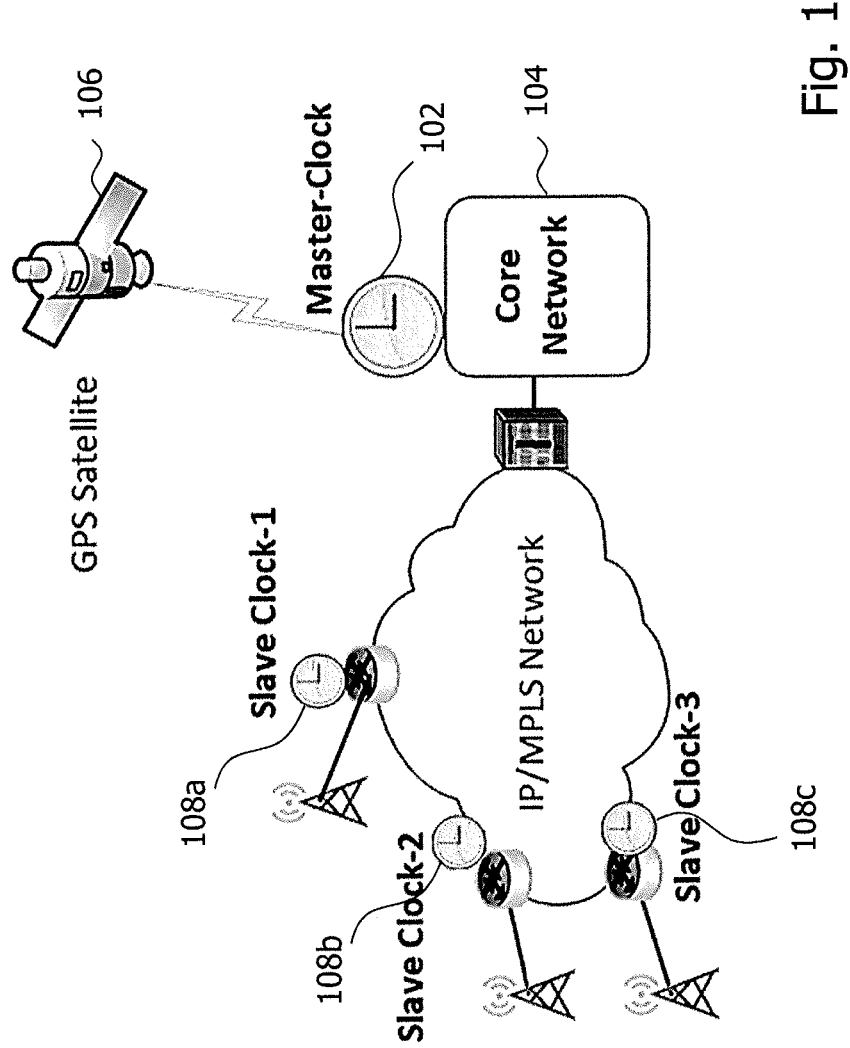
FIG. 1 illustrates an exemplary scenario in which a master clock serves three slave clocks and uses a GPS satellite as time source.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

FIG. 2a schematically illustrates an exemplary embodiment of a master device 200 for performing time synchronization between the master device 200 and a slave device. The master device 200 comprises processing means enabling the master device 200 to perform the method steps described herein below. In the shown example, the processing means comprise at least one processor 202 and at least one memory 204, wherein the at least one memory 204 contains instructions executable by the at least one processor 202 such that the processing means are operable to carry out the method steps described herein with respect to the master device. The master device 200 further comprises an optical wireless communication interface 206 by means of which the master device 200 may exchange optical wireless signals with other devices, such as the slave device. Optionally, the master device 200 may include an RF interface 208 by means of which the master device 200 may perform RF-based wireless communication with other devices, such as the slave device.

FIG. 2b schematically illustrates an exemplary embodiment of a slave device 210 for performing time synchronization between a master device (e.g., the master device 200) and the slave device 210. The slave device 210 comprises processing means enabling the slave device 210 to perform the method steps described herein below. In the shown example, the processing means comprise at least one processor 212 and at least one memory 214, wherein the at least one memory 214 contains instructions executable by the at least one processor 212 such that the processing means are operable to carry out the method steps described herein with respect to the slave device. The slave device 210 further comprises an optical wireless communication interface 216 by means of which the slave device 210 may exchange optical wireless signals with other devices, such as the master device 200. Optionally, the slave device 210 may include an RF interface 218 by means of which the slave device 210 may perform RF-based wireless communication with other devices, such as the master device.

Time synchronization may generally refer to the process of keeping the clocks of multiple devices synchronized. As described above, among the multiple devices, the master device 200 may be synchronized with a reliable time source, such as GPS or an atomic clock, and maintain a master clock time that may be used by slave devices 210 to align their clocks to the clock of the master device 200. Among the multiple devices, the slave devices 210 may be the devices which rely on the clock of the master device 200 to correct their timing. According to the technique presented herein, a reference time source may be distributed from the master device 200 to one or more slave devices 210 using color encoded as timestamps. In this way, accurate synchronization may be accomplished without the problems of conventional RF-based time synchronization systems. This technique and its advantages will be described in more detail herein below.

FIG. 3 illustrates a method which may be performed by the master device 200 according to the present disclosure. The method is dedicated to performing time synchronization between the master device 200 and the slave device 210. In step S302, the master device 200 may transmit, using optical wireless signals, a timestamp representative of a clock time of the master device to the slave device, wherein the timestamp is encoded using a color-based optical coding scheme and is to be used by the slave device to set a clock time of the slave device in accordance with the timestamp to thereby synchronize the clock time of the slave device with the clock time of the master device.

Time synchronization between the master device 200 and the slave device 210 may thus be performed by transmitting a reference time indicative of the current clock time of the master device 200 to the slave device 210 to thereby enable the slave device 210 to align its clock time with that of the master device 200. Rather than the conventional RF-based time synchronization techniques described above, the technique presented herein may thus employ optical wireless signals to transmit timestamps from the master device 200 to the slave device 210. In doing so, timestamps may be encoded using different color codes, which may—once received at the slave device 210—be converted to corresponding time values for time synchronization purposes of the slave device 210. Different optical color codes may represent different timestamps, and time synchronization may thus be said to be performed using multiple color optical signals. Once a timestamp representative of a clock time of the master device 200 is received by the slave device 210, the slave device 210 may set its clock time in accordance with the received timestamp to thereby synchronize its clock time with the clock time of the master device 200.

Optical wireless signals (or "optical wireless communication") may involve any type of information transfer in which the medium used for the information transfer is an optical medium. This may comprise a spectrum of light (the entire spectrum of light or a part thereof), including at least one of visible, infrared or ultraviolet light, for example. The optical wireless signals may thus be transmitted as part of LC. In other words, the light spectrum may be employed as the means of communication. VLC, as one particular variant of LC, may employ visible light as means of communication. Optionally, the optical wireless signals may thus also be transmitted as part of at least one of infrared, ultraviolet and visible light communication (VLC). LC may offer an unlicensed spectrum that may be used for communication at high data rates, and that may serve as a complementary communication technology to the current RF standards. While actual (or "regular") data transfer between the master device 200 and the slave device 210 may be carried out using RF-based communication (e.g., using the RF interfaces 208 and 218), the optical wireless signals may be employed as a complementary communication technology (e.g., exclusively) used for time synchronization between the master device 200 and the slave device 210. It will be understood that the optical wireless signals may also be used in combination with regular data communication, for example.

Taking VLC as an example, VLC is a communications variant which may use frequencies between 400 and 800 THz (wavelengths 780-375 nm) and which may generally have advantages over RF in terms of unlicensed spectrum, interference, security and low cost, as will be discussed in more detail below. In VLC, data may be transmitted imperceptibly in parallel way through the variation of the color emitted by light emitting diodes (LEDs) of different color. Using LEDs, transmitters may switch to different light colors at fast rates, wherein the switching rate may be fast enough to be imperceptible by the human eye. This functionality may be employed to encode data in the emitted light for communication purposes. At the receiving side of the transmitted optical wireless signals, a photodetector (or "light sensor"/"photodiode"), or an image sensor (i.e., a matrix of photodiodes), may be used to receive the transmitted optical signals and decode the communicated data therefrom.

Figure 4A:
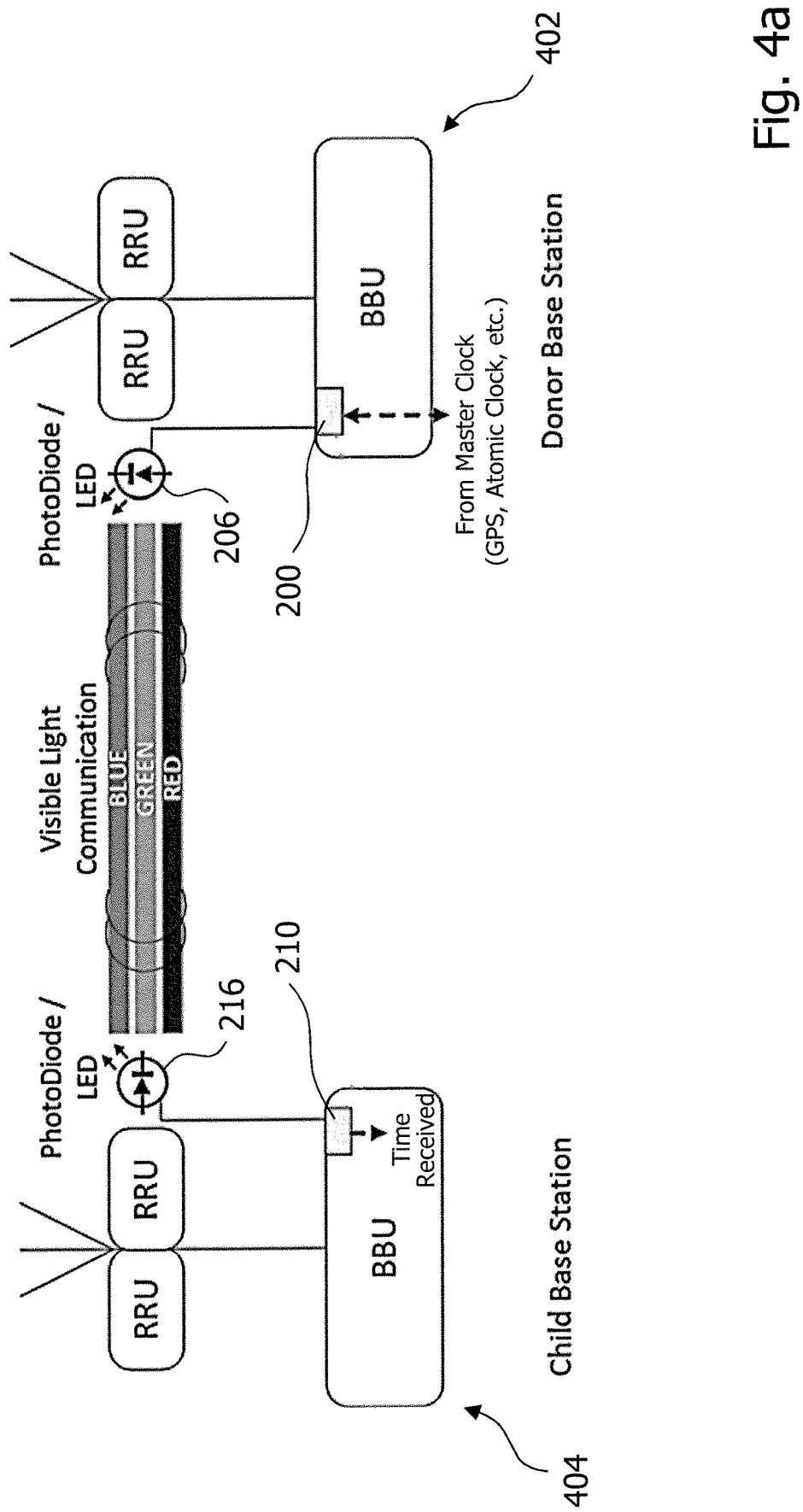
FIGS. 4a and 4b illustrate exemplary setups in which optical wireless signals are used for time synchronization according to the present disclosure.
Figure 4B:
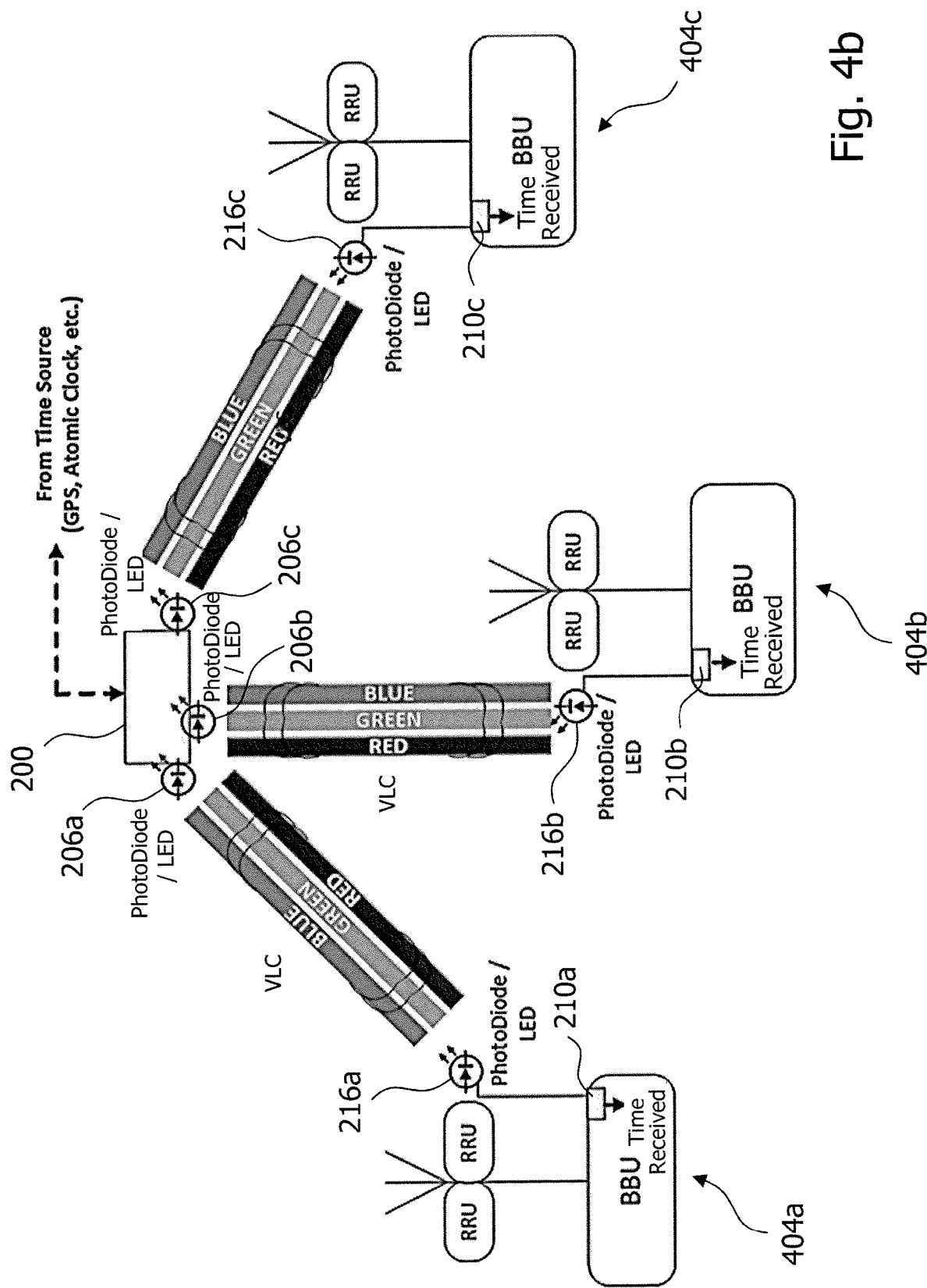

FIGS. 4a and 4b illustrate two different exemplary setups in which optical wireless signals (in the shown example, RGB-based VLC) are used for time synchronization. FIG. 4a illustrates a use case in which the master device 200 communicates with a single slave device 210. The optical wireless communication interface 206 of the master device 200 may comprise one or more LEDs for transmission of optical signals and one or more of photodiodes for reception of optical signals. The optical wireless communication interface 216 of the slave device 210 may likewise comprise one or more LEDs for transmission of optical figures and one or more photodiodes for reception of optical signals.

The clock time of the master device 200 may be time-synchronized with a master clock which, as indicated in the figure, may be a reliable time source, such as GPS or an atomic clock, for example. The master device 200 may thus get the current timestamp from a GPS system (when the required infrastructure is available), or it 3s can be retrieved from a reliable local (e.g., atomic) clock, for example. The clock time of the master device 200 may be transmitted in the form of a timestamp to the slave device 210 using the VLC, and the slave device 210 may use the received timestamp ("Time Received" in the figure) once decoded to synchronize with the clock time of the master device 200, as described above. In the shown example, the master device 200 and the slave device 210 are part of respective base stations of a wireless communication system. More specifically, the master device 200 may be part of the base-band unit (BBU) of a donor base station 402 and the slave device 210 may be part of the BBU of a child base station 404. At least one of the master device 200 and the slave device 210 may thus be a radio network node (e.g., a base station) of a wireless communication system.

It will be understood that communication/synchronization of the master device 200 with just one slave device 210 is merely exemplary and that the master device 200 may perform communication/time synchronization with a plurality of slave devices 210. The slave device 210 may in other words be one of a plurality of slave devices with which the master device 200 performs time synchronization. Such use case is exemplarily illustrated in FIG. 4b, which essentially differs from the use case shown in FIG. 4a in that the master device 200 is a separate (e.g., central) master device that may perform time synchronization with a plurality of slave devices 210a-c, each belonging to respective base stations 404a-c. The corresponding optical wireless communication interfaces are denoted by 206a-c and 216a-c in the figure. In such a use case, the master device 200 may be said to distribute (or "broadcast") its clock time by sending out respective timestamps to multiple slave devices at the same time. It will further be understood that the use of VLC on the basis of an RGB-based optical coding scheme is merely exemplary. While, in such case, RGB LEDs may be used as part of the optical wireless communication interfaces 206 and 216, it will be understood that any other multicolor LED may generally be employed.

The optical wireless communication system presented herein may be employed in industrial applications, for example. The master device 200 and the slave device 210 (or multiple slave devices 210) may thus be part of an (e.g., indoor) industrial infrastructure (e.g., installed in a factory or industrial hall), for example. As compared to RF-based systems, for optical wireless communication systems, the only degradation factor regarding communication quality may be light pollution. In VLC systems, for example, there may be two types of noise, namely (i) sunlight and light noise coming from illumination fixtures and (ii) light noise from other VLC transmitters, which may lead to light interference.

Regarding (i) sunlight and light noise coming from illumination fixtures, the effect of such light may be the addition of a constant light component added onto the undistorted received optical signal as well as an insignificant increase of ambient noise. The effect of such type of light noise may be negligible in indoor industrial applications, where the environment may generally be controlled and carefully designed. In addition, industrial spaces may usually be closed environments, with few windows or even no windows at all.

Regarding (ii) light noise from other VLC transmitters, the effect of light interference originating from other VLC transmitters may be negligible as well, or be removed relatively easy. In existing RF-based wireless time synchronization standards, since synchronization and coordination of industrial applications may be critical for the smooth operation, time synchronization is typically separated from any other service, wherein the separation may be in the time domain or in the frequency domain. An example is GPS, which is not used for (wide) communication purposes. Optical wireless signals for time synchronization may thus be (e.g., totally) separated from any other communication performed using optical wireless communication, and due to such "orthogonality" of time synchronization with other communication, there may be no degradation at all due to interference coming from other VLC transmitters.

As said, the master device 200 may transmit the timestamp to the slave device 210, wherein the timestamp may be encoded using a color-based optical coding scheme. Such coding scheme may be implemented in various ways. In one variant, timestamps may be encoded using light communication specific modulation formats, such as CIM, CSK, MM, PAM, or optical OFDM, for example. The color-based optical coding scheme may thus correspond to an optical wireless communication specific modulation scheme, and the optical wireless communication specific modulation scheme may include at least one of CIM, CSK, MM, PAM, and optical OFDM. CSK is a light communication intensity modulation scheme outlined in the IEEE 802.15.7 standard, for example, that allows transmitting data imperceptibly through the variation of the color emitted by red, green and blue LEDs. An advantage of CSK may be that the power envelope of the transmitted signal is fixed. CSK may therefore reduce the potential for human health complications related to fluctuations in the light intensity.

As an alternative to light communication specific modulation formats, each timestamp may directly be represented as one particular shade of color. In such a case, the color-based optical coding scheme may be implemented using a predefined color codebook according to which different timestamps are encoded by different shades of color. Transmitted and received timestamps may therefore be represented as different points of a given color representation system. For example, in an RGB color representation system, timestamps may be represented as different shades of red, green and blue. It will be understood, however, that any other color representation system may be used, e.g., depending on certain illumination constraints set for a given light communication deployment. In the general case, for the representation of timestamps, K color components with n bits per color components may be used. In this case, the resolution of each timestamp may be Kn bits, enabling the timestamps to quantize the time interval of interest by $K2^n$ points. In the color codebook, each shade of color may thus be defined by a predefined number of color components, each being defined by a predefined number of bits representative of a value of the respective color component. The predefined number of color components and the predefined number of bits may be defined in accordance with an RGB color representation scheme, for example, but, as said, any other color representation scheme may be employed as well. For example, in the general case, a shade of color in a given color representation system may be represented by a vector. The i-th element of this vector may correspond to the i-th color component of the considered color representation system. A translation between different color representation systems, like between RGB and Cyan, Magenta, Yellow and Key (CMYK) may be done via an appropriate transformation, for example.

For a general color representation system, any number of colors and any discretization per color component may generally be used for timestamp encoding. The operating principle may be that timestamps are encoded in a number of color components with a given discretization per color component. It will be understood that there may be practical/technological constraints regarding the number of used colors and discretization per color component which should be considered to determine whether or not a system can be implemented. In practice, a trade-off may thus be made between the color codebook size and its time representation precision. A smaller codebook may be more robust, but with lower time precision, and vice versa. As an example, to ensure smooth and deterministic execution of a machine production cycle, timely coordination among devices/machines may have to be accomplished, which may only be possible if the devices/machines are synchronized to a common time reference with a clock disparity of less than 1 µs. The model used for the color codebook may be held as wide as possible in order to cover current or future technology trends, system requirements and deployment needs, for example.

A K multicolor light communication system may be implemented by luminaires having K LEDs of different color and photodiodes which are encoded with one out of K optical color filters, for example. Due to the optical filtering, any inter-color interference may be avoided and each color component may be distorted only by additive noise. As the noise in each color component may be different, the detection of SNR in each color component may be different as well. This may motivate the allocation of more time representation bits to the color components that have a higher SNR. Color components having a higher SNR in the optical wireless signals than other color components among the predefined number of color components may thus be assigned more bits of the predefined number of bits than the other color components.

In the following, specific examples of color codebook based timestamp encoding will be described with reference to FIGS. 5 and 6a to 6c. The examples will be described with reference to RGB luminaires exemplifying how color-based synchronization may be accomplished using RGB LEDs. It will be understood, however, that any other color combination than one generated by RGB LEDs can generally be used.

An RGB LED may be seen as a device which uses electroluminescence and semiconductors in order to generate light of different colors, which may be achieved by combining red, green and blue color outputs. In the RGB color representation model, a color may be described by indicating the numerical value that represents how much of the red, green and blue portion is to be included in the combination. Such color may be expressed as an RGB triplet (R, G, B), each component of which may vary from 0 to a defined maximum value. If all color components are at 0, the resulting color may be black, if all the color components are at the maximum value, the resulting color may be the brightest representable white. In today's computing systems, the color component values are often stored as integer numbers in the range from 0 to 255 (i.e., the range a single byte (8-bit) can offer). As an example, FIG. 5 illustrates exemplary shades of color obtained by different RGB values. In the given example range from 0 the 255, a total of 256 values are available for red color, 256 values are available for green color, and 256 values are available for blue color. The resulting total number of available shades of color resulting from such RGB scheme amounts to: 256*256*256=16.777.216 colors.

Figure 6A:
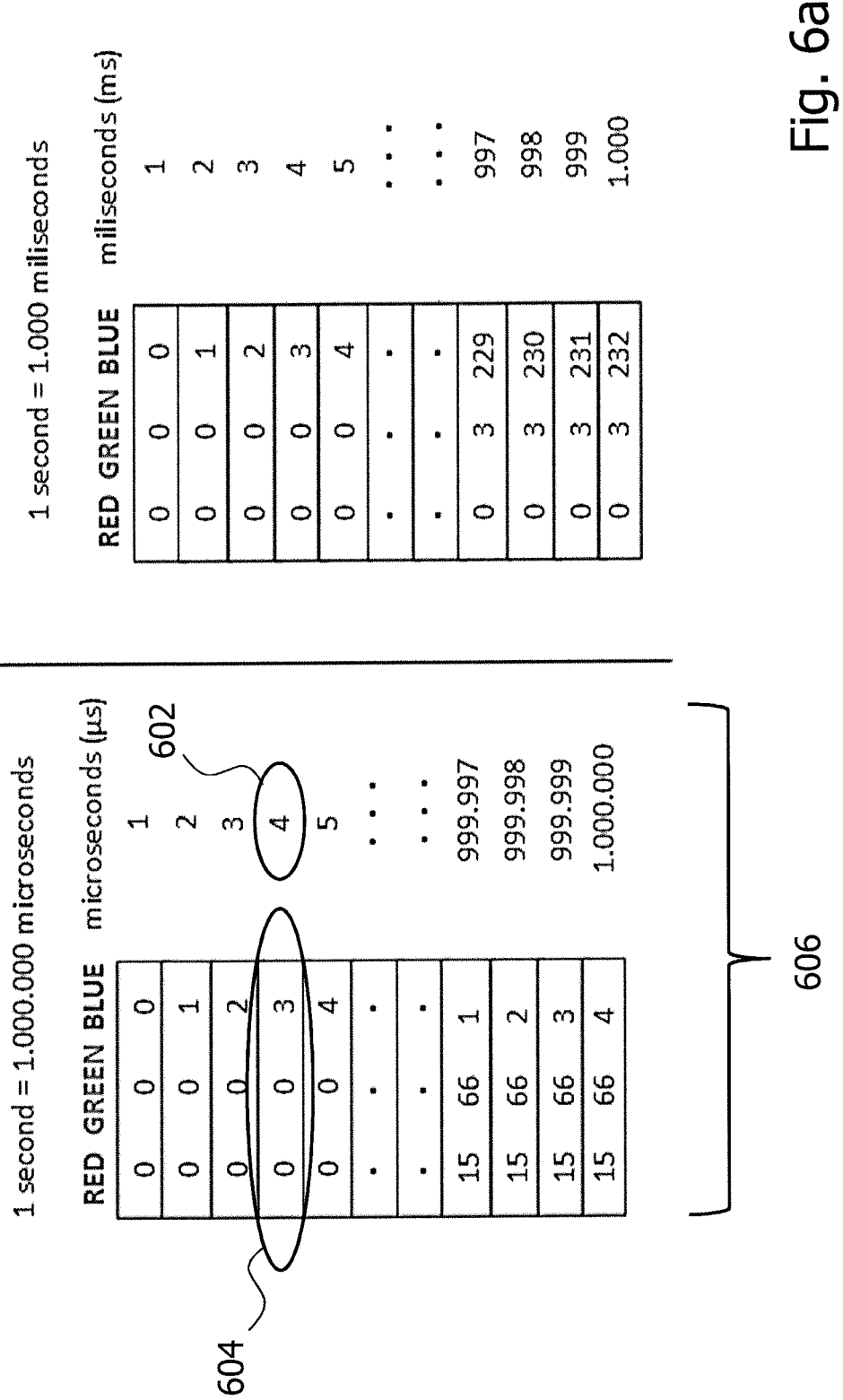
FIGS. 6a to 6c illustrate exemplary color codebook mappings between RGB colors and units of time according to the present disclosure.

FIG. 6a illustrates two exemplary color codebook mappings between RGB colors 3s and units of time, which are representative of the available timestamps. In the left-hand portion of the figure, the precision of the time units is given in µs and, in the right-hand portion of the figure, the precision is given in ms. Since 1 second corresponds to 1.000.000 µs, the left-hand portion of the figure shows a mapping of 1.000.000 timestamps/time units to 1.000.000 different RGB triplets, starting from (0, 0, 0) and increasing by 1 for each µs. Similarly, since 1 second corresponds to 1.000 ms, the right-hand portion of the figure shows a mapping of 1.000 timestamps/time units to 1.000 different RGB triplets, starting from (0, 0, 0) and increasing by 1 for each ms. As indicated in the figure, the timestamp "4 µs" (denoted by reference numeral 602 in the figure) is mapped to RGB triplet (0, 0, 3) (representing the color code for the timestamp; denoted by reference numeral 604 in the figure), for example. All mappings between the RGB colors and the timestamps/time units may together form the color codebook 606. In general terms, it may thus be said that the predefined number of bits of the predefined number of color components may be interpreted as a numerical value, wherein timestamps may be defined in accordance with a minimum time unit (representative of a minimum step size, such as µs/ms, for example). Increments on a level of the minimum time unit may then be encoded by increments of the numerical value. It will be understood, however, that alternative mapping methods for color codebook mappings between RGB colors and timestamps/time units are generally conceivable. As a mere example, RGB triplets may be selected out of order, or random values of RGB triplets may be selected for the mapping of units of time. Even mixtures of the different types of mapping may be conceivable in a color codebook.

Figure 6B:
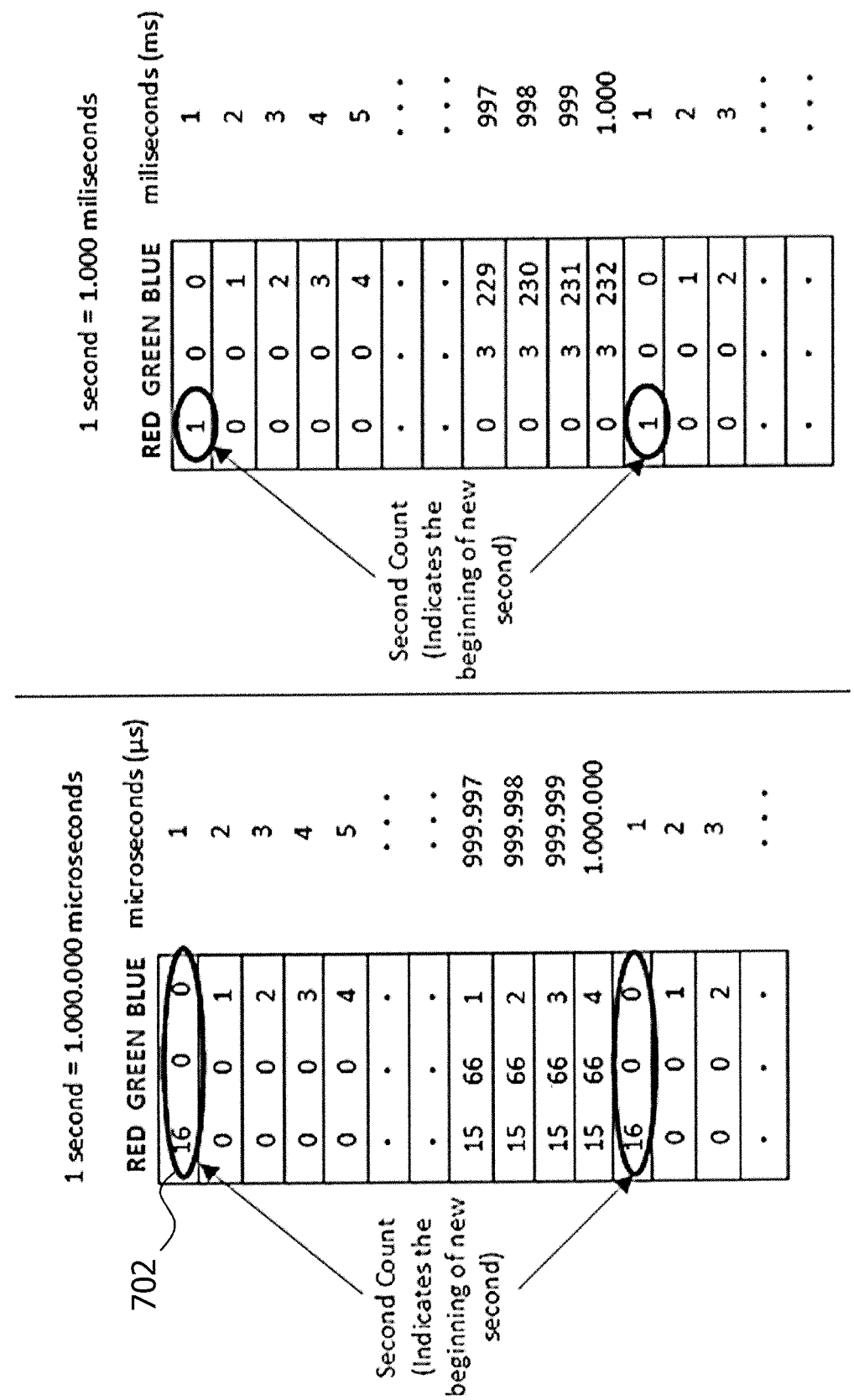
Figure 6C:
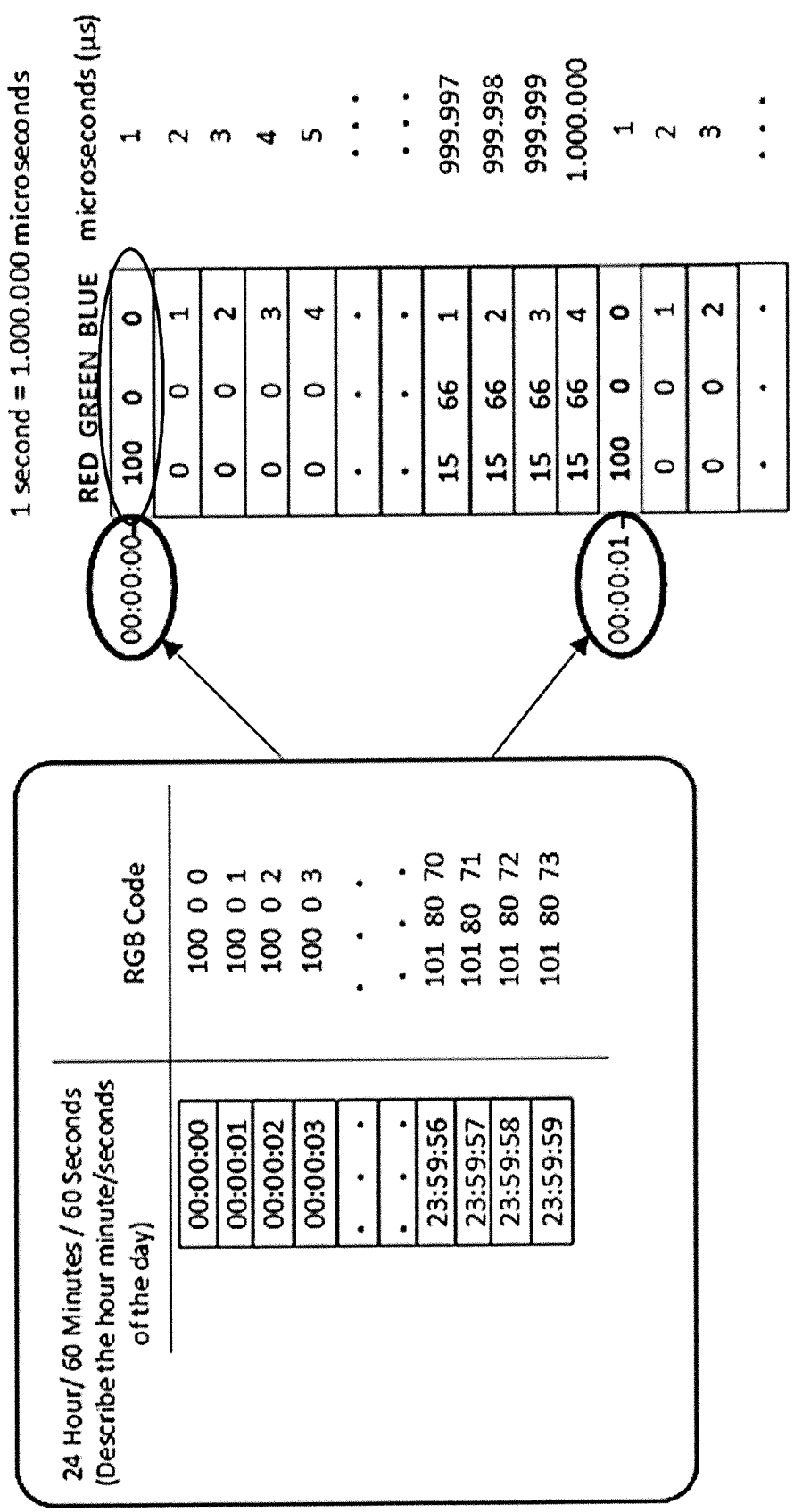

Dedicated RGB triplets may be defined (or "reserved") as time markers. For example, some special RGB triplet options may be defined in the color codebook for the determination of the start of new time units. FIG. 6b exemplarily illustrates two color codebook mappings which build upon those of FIG. 6a, wherein, additionally, RGB triplet (16, 0, 0) (denoted by reference 702 in the figure) is used as a time marker indicative of the start of a new second in the left-hand µs-based example. Likewise, RGB triplet (1, 0, 0) is used as a time marker indicative of the start of a new second in the right-hand ms-based example. Since such time markers may be known by both the master device 200 and slave device 210, they may be used to quickly reestablish synchronization, even if synchronization was lost previously (in some cases, synchronization may be lost due to interrupts of the link between the transmitter and the receiver; such interrupts may be avoided by utilizing multiple optical transmitters that may eliminate possible link interruptions, for example). As shown in FIG. 6c, a day corresponds to 24 hours, an hour corresponds to 60 minutes, and a minute corresponds to 60 seconds, so that a day has 24*60*60=86.400 seconds. As indicated on the left-hand portion of the figure, 86.400 RGB triplets are therefore required to identify the hours/minutes/second sensitivity for a day. As shown in the figure, in this case, another RGB triplet (100, 0, 0) may be used to indicate the start of a new second in a day, for example.

It should be noted that currently commercially available photodiodes may generally have the capability to perceive a huge number of colors using different lenses. As such, there may typically be no need for any additional circuitry or processing. If needed to create more robustness in detection of color-coded timestamps, larger gaps may be defined between color codes adjacent in the color codebook, i.e., the gaps forming guard bands that increase accuracy in the detection by the photodiodes and the color mapping to the timestamps. A guard band may in other words be an unused part of the color spectrum between color codes that may be introduced for the purpose of preventing interference. In a color spectrum of the color codebook, at least some portions of the color spectrum between adjacent codes represented by the shades of color may thus not be used for timestamp encoding.

Figure 7:
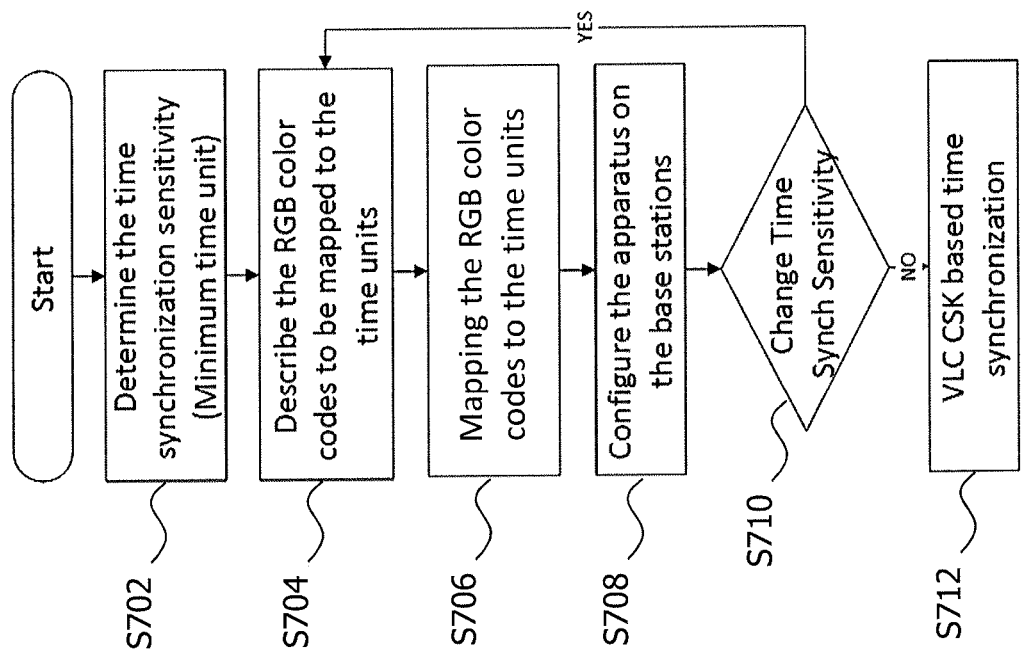
FIG. 7 illustrates an exemplary method which may be used to determine color codes for a color codebook according to the present disclosure.

FIG. 7 illustrates an exemplary method which may be used to determine the color codes of a color codebook. In step S702, a minimum time unit may initially be selected to determine the desired time synchronization sensitivity. In step S704, the color codes which are to be mapped to the time units may be described and, in step S706, the color codes may then be mapped to the corresponding time units. In step S708, the master device 200 and the slave device 210 may be configured with this mapping, thereby implementing the color codebook. When time synchronization sensitivity is changed later on (step S710), the method may loop back and proceed with step S704. Otherwise, when no changes are applied, merely as an example, the method may switch to applying an optical wireless communication specific modulation scheme, such as CSK.

Figure 8:
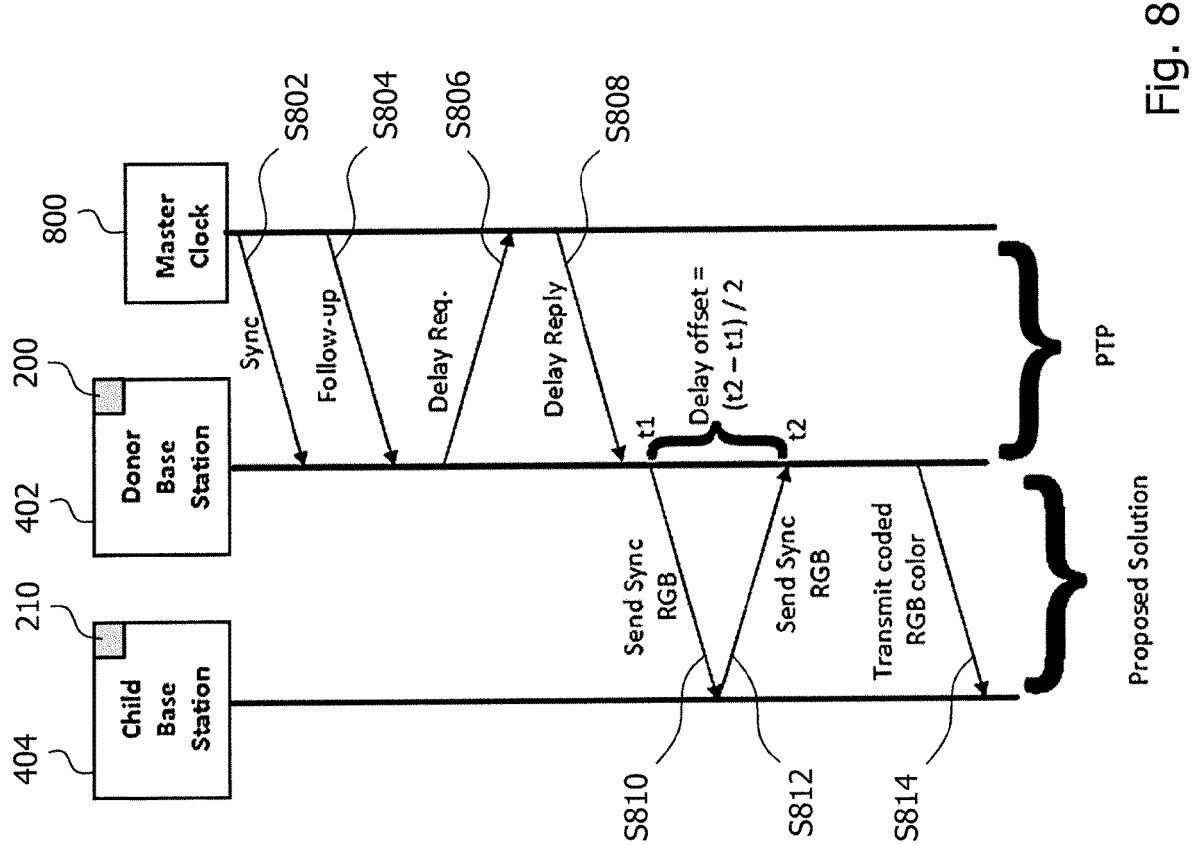
FIG. 8 illustrates an exemplary signaling diagram elucidating a method according to the present disclosure.

FIG. 8 illustrates an exemplary signaling diagram elucidating the method described herein in a broader context. In the presented example, a Precision Time Protocol (PTP) messaging sample is used for illustration of the synchronization between a master clock 800 (e.g., GPS, atomic clock), which provides a reliable time source, and the master device 200. It will be understood that any other time protocol may generally be used to synchronize the master device 200 with the master clock 800. In the shown example, in step S802, the master clock 800 may prepare a SYNC message and write the actual timestamp into the SYNC message at that time. Due to processing time, medium access, and propagation delay, sending a timestamp may not be highly precise. To mitigate this issue, a message FOLLOW_UP may be sent afterwards in step S804. This message may contain the exact sending time as it has been recorded by the hardware or, if not available, by the Interrupt Service Routine (ISR) processing the TX-complete interrupt. The choice between hardware timestamping (if available) and software timestamping may have an impact on the possible precision. The master device 200 may then calculate its offset to the master clock 800. Yet, this has the error of the propagation delay, which has to be subtracted in order to get the correct value. To determine propagation delay, the master device 200 may send a DELAY_REQUEST message to the master clock 800 in step S806, which may be answered by the master clock 800 by timestamping and sending back a DELAY_REPLY message in step S808.

After that, the above-described method for time synchronization between the master device 200 and the slave device 210 may begin. Since, in cases of long-range distances, propagation delay between the master device 200 and the slave device 210 may become perceivable, a delay offset accounting for such may be calculated (even though the speed of light is 300.000 km/s, there may still be a propagation delay; further delay may arise from hardware or software delays at the master device 200 and the slave device 210, for example). To resolve the delay problem, a preliminary synchronization process may be performed. In the synchronization process, the master device 200 may encode a timestamp t1 representative of a current clock time of the master device 200 using the color-based optical coding scheme (an RGB-based scheme in the shown example) and send, using optical wireless signals, in step S810, the timestamp t1 to the slave device 210. The slave device 210, in turn, may likewise encode a timestamp t2 representative of a current clock time of the slave device 210 using the color-based optical coding scheme and send, using optical wireless signals, in step S812, the timestamp t2 to the master device 200. Based on timestamps t1 and t2, the master device 200 may then calculate a delay offset=(t2−t1)/2. In other words, the delay offset may be determined as half of an RTT observed in the optical wireless signals transmitted between the master device 200 and the slave device 210. In one possible implementation, when the master device 200 sends the timestamp t1, it may start a counter and the counter may run until the master device 200 receives timestamp t2 from the slave device 210. The value of the counter may then be divided by 2 since there are two propagation delays for the two messages in step S810 and S812.

When the master device 200 then transmits, in step S814, a timestamp representative of a current clock time of the master device 200 to the slave device 210 for time synchronization purposes of the slave device 210 (in accordance with the above-described step S302), the calculated delay offset may be employed to compensate for the delay observed between the master device 200 and the slave device 210. More specifically, the timestamp transmitted in step S814 may be adjusted by the delay offset (e.g., the delay offset may be added to the timestamp) before transmitting the timestamp to the slave device 210 on the side of the master device 200, or the timestamp may be adjusted (e.g., the delay offset may be added to the timestamp) by the delay offset after reception of the timestamp on the side of the slave device 210. Thus, from the viewpoint of the master device 210, the timestamp may be adjusted by a delay offset before transmitting the timestamp to the slave device 210, or the timestamp may be to be adjusted by the slave device 210 by a delay offset after reception of the timestamp.

Figure 9:
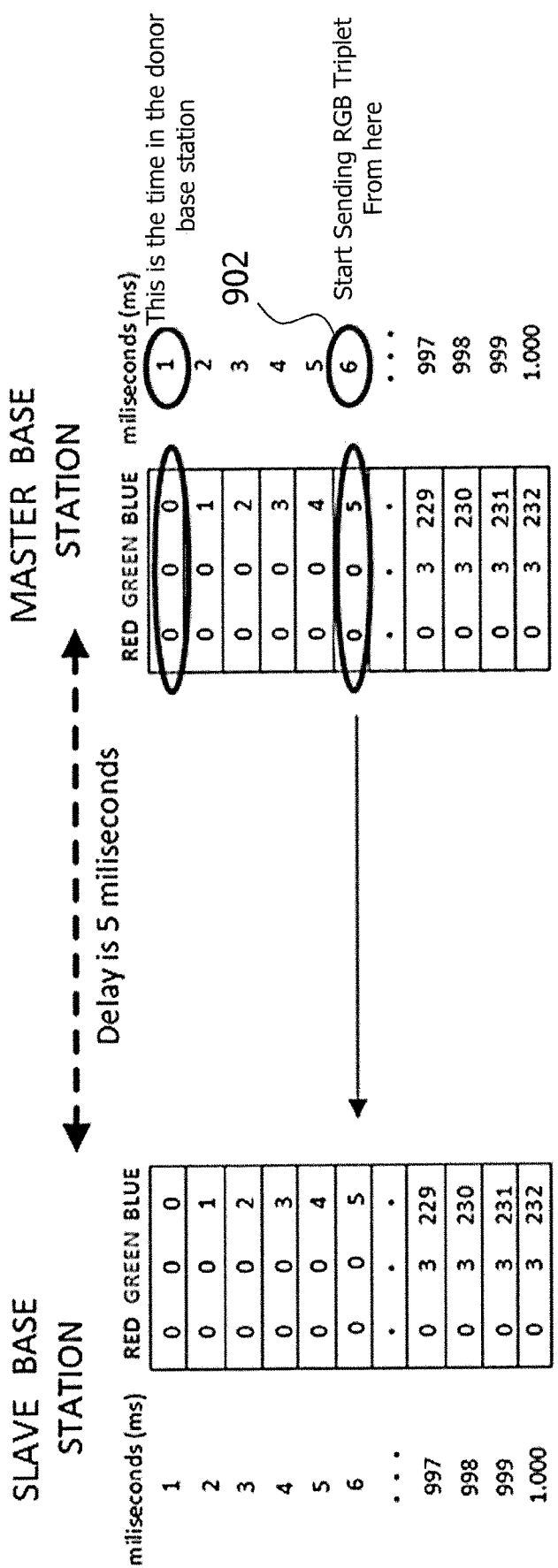
FIG. 9 illustrates an adjustment of a timestamp by a delay offset before transmitting the timestamp to the slave device.

FIG. 9 exemplarily illustrates such adjustment of a timestamp by a delay offset in with reference to the example shown in the right-hand portion of FIG. 6a. In FIG. 9, the delay offset is assumed to be 5 ms. Therefore, although the current clock time "1 ms" of the master device 200 would actually be mapped to RGB triple (0, 0, 0), the master device 200 adds the delay offset to this timestamp, resulting in the timestamp "6 ms" (denoted by reference 902 in the figure) being mapped to RGB triple (0, 0, 5), which is then instead sent to the slave device 210 in order to account for the observed propagation delay and to allow the slave device 210 to precisely synchronize to the current clock time of the master device 200.

FIG. 10 illustrates a method which may be performed by the slave device 210 according to the present disclosure. The method is dedicated to performing time synchronization between the master device 200 and the slave device 210. The operation of the slave device 210 may be complementary to the operation of the master device 200 described above and, as such, aspects described above with regard to the operation of the slave device may be applicable to the operation of the slave device 210 described in the following as well, and vice versa. Unnecessary repetitions are thus omitted in the following.

In step S1002, the slave device 210 may receive, using optical wireless signals, a timestamp representative of a clock time of the master device 200 from the master device 200, wherein the timestamp is encoded using a color-based optical coding scheme. In step S1004, the slave device 210 may set a clock time of the slave device 210 in accordance with the timestamp to synchronize the clock time of the slave device 210 with the clock time of the master device 200.

As described above in relation to FIG. 3, the optical wireless signals may be transmitted as part of LC and, optionally, as part of at least one of infrared, ultraviolet and visible light communication (VLC). The clock time of the master device 200 may be time-synchronized with a master clock. At least one of the master device 200 and the slave device 210 may be a radio network node of a wireless communication system.

The color-based optical coding scheme may correspond to an optical wireless communication specific modulation scheme. The optical wireless communication specific modulation scheme may include at least one of CIM, CSK, MM, PAM, and optical OFDM. Alternatively, the color-based optical coding scheme may be implemented using a predefined color codebook according to which different timestamps are encoded by different shades of color. In the color codebook, each shade of color may be defined by a predefined number of color components, each being defined by a predefined number of bits representative of a value of the respective color component. The predefined number of color components and the predefined number of bits may be defined in accordance with an RGB color representation scheme.

Color components having a higher SNR in the optical wireless signals than other color components among the predefined number of color components may be assigned more bits of the predefined number of bits than the other color components. The predefined number of bits of the predefined number of color components may be interpreted as a numerical value and timestamps may be defined in accordance with a minimum time unit. Increments on a level of the minimum time unit may be encoded by increments of the numerical value.

The color codebook may comprise a code for indicating a start of a new time unit. The new time unit may be one of a second, a minute, an hour, and a day. In a color spectrum of the color codebook, at least some portions of the color spectrum between adjacent codes represented by the shades of color may not be used for timestamp encoding.

The timestamp may be adjusted by the master device 200 by a delay offset before transmitting the timestamp to the slave device 210. Alternatively, the timestamp may be adjusted by the slave device 210 by a delay offset after reception of the timestamp. The delay offset may account for a propagation delay observed between the master device 200 and the slave device 210. The delay offset may correspond to half of an RTT observed in the optical wireless signals transmitted between the master device 200 and the slave device 210.

As has become apparent from the above, the present disclosure provides a technique for performing time synchronization between a master device and a slave device. The master device may encode a timestamp using a predefined color codebook and may transmit the timestamp by means of optical signals to the slave device for time synchronization purposes of the slave device. With respect to conventional RF-based time synchronization techniques, the technique presented herein may be summarized to, inter alia, provide the following advantages:

The propagation characteristics of the light communication channel may be different from RF communication. In particular, the light channel may be more directive, with less multi-path propagation, and without small scale fading. Inter-layer interference in the RF case may completely be avoided in optical communication due to their different operating frequency bands.

The implementation cost of the technique presented herein may be expected to be lower. Optical components may be by far less expensive than the existing RF front ends. For this reason, it may be expected that color-based time synchronization systems will be cheaper than the ones that use RF signals.

Light transmitters may be more energy-efficient sources and using light communication may achieve higher energy efficiency. Thus, time synchronization in accordance with the technique presented herein may achieve an overall higher energy efficiency compared to synchronization methods which use RF signals.

In synchronization with light communication, front-end components of both transmitters and receivers may be relatively simple devices. They may operate in the baseband and may not require frequency mixers or sophisticated algorithms for the compensation of RF impairments, such as phase noise and IQ imbalance. Moreover, only the detection of light by the existing photodiodes may be enough for the operation of this form of synchronization system. Due to the faster processing and less errors in the reception of timestamps, the latency of time synchronization using light signals may be less than the corresponding one using RF signals.

The light communication may be an unlicensed spectrum with still limited use for communication. The availability of this unlicensed spectrum for time synchronization may decrease the overall cost of broadband communication that could alleviate the spectrum congestion currently evident in the 2.4 GHz industrial, scientific, and medical band.

Due to its propagation properties, light may offer security advantages when compared to radio waves. When an RF access point is configured, radio waves may propagate according to the antenna's broadcasting capacity, which can reach hundreds of meters. In this process, waves may surpass walls and other solid surfaces and may pose a security risk, since eavesdropping and sniffing attempts may occur. Light, in turn, may not follow this behavior. Its waves may not go beyond walls and other surfaces, offering a much safer environment, where basically what is being transmitted is what you see. The lacking possibility of manipulating light waves may be an advantage of this form of communication. For the same reason, the use of light for time synchronization may not suffer from external intentional jamming, which may be important in industrial use cases.

A general color representation system may be used to symbolize timestamps employed in a time synchronization system. It may thus be easy to match the technique presented herein to the PTP protocol. An example may be the IEEE 1588 Standard, where the domainNumber (RF timestamps) may be in the range of 0 to 255. The value of the domainNumber shall be configurable subject to limits established by a PTP profile. Also, many PTP specifications may be identified in the range of 0 to 255, such as clockClass and clockAccuracy enumeration, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for performing time synchronization between a master device and a slave device, the method being performed by the master device and comprising:
transmitting, using optical wireless signals, a timestamp representative of a clock time of the master device to the slave device, wherein the timestamp is encoded using a color-based optical coding scheme and is to be used by the slave device to set a clock time of the slave device in accordance with the timestamp to thereby synchronize the clock time of the slave device with the clock time of the master device;
wherein the color-based optical coding scheme is implemented using a predefined color codebook according to which different timestamps are encoded by different shades of color.

2. The method of claim 1, wherein the optical wireless signals are transmitted as part of light communication (LC).

3. The method of claim 2, wherein the optical wireless signals are transmitted as part of at least one of infrared, ultraviolet and visible light communication (VLC).

4. The method of claim 1, wherein the clock time of the master device is time-synchronized with a master clock.

5. The method of claim 1, wherein, in the color codebook, each shade of color is defined by a predefined number of color components, each being defined by a predefined number of bits representative of a value of the respective color component, wherein the predefined number of color components and the predefined number of bits are defined in accordance with a Red Green Blue (RGB) color representation scheme.

6. The method of claim 5, wherein color components having a higher signal-to-noise ratio (SNR) in the optical wireless signals than other color components among the predefined number of color components are assigned more bits of the predefined number of bits than the other color components.

7. The method of claim 5, wherein the predefined number of bits of the predefined number of color components are interpreted as a numerical value and wherein timestamps are defined in accordance with a minimum time unit, wherein increments on a level of the minimum time unit are encoded by increments of the numerical value.

8. The method of claim 1, wherein the color codebook comprises a code for indicating a start of a new time unit, wherein the new time unit is one of a second, a minute, an hour, and a day.

9. The method of claim 1, wherein, in a color spectrum of the color codebook, at least some portions of the color spectrum between adjacent codes represented by the shades of color are not used for timestamp encoding.

10. A method for performing time synchronization between a master device and a slave device, the method being performed by the slave device and comprising:
receiving, using optical wireless signals, a timestamp representative of a clock time of the master device from the master device, wherein the timestamp is encoded using a color-based optical coding scheme, wherein the color-based optical coding scheme is implemented using a predefined color codebook according to which different timestamps are encoded by different shades of color; and
setting a clock time of the slave device in accordance with the timestamp to synchronize the clock time of the slave device with the clock time of the master device.

11. The method of claim 10, wherein the optical wireless signals are received as part of light communication (LC).

12. The method of claim 11, wherein the optical wireless signals are received as part of at least one of infrared, ultraviolet and visible light communication (VLC).

13. The method of claim 10, wherein the clock time of the master device is time-synchronized with a master clock.

14. The method of claim 10, wherein, in the color codebook, each shade of color is defined by a predefined number of color components, each being defined by a predefined number of bits representative of a value of the respective color component, wherein the predefined number of color components and the predefined number of bits are defined in accordance with a Red Green Blue (RGB) color representation scheme.

15. The method of claim 14, wherein color components having a higher signal-to-noise ratio (SNR) in the optical wireless signals than other color components among the predefined number of color components are assigned more bits of the predefined number of bits than the other color components.

16. The method of claim 14, wherein the predefined number of bits of the predefined number of color components are interpreted as a numerical value and wherein timestamps are defined in accordance with a minimum time unit, wherein increments on a level of the minimum time unit are encoded by increments of the numerical value.

17. The method of claim 10, wherein the color codebook comprises a code for indicating a start of a new time unit, wherein the new time unit is one of a second, a minute, an hour, and a day.

18. The method of claim 10, wherein, in a color spectrum of the color codebook, at least some portions of the color spectrum between adjacent codes represented by the shades of color are not used for timestamp encoding.

19. A master device for performing time synchronization between the master device and a slave device, the master device comprising processing means configured to:
transmit, using optical wireless signals, a timestamp representative of a clock time of the master device to the slave device, wherein the timestamp is encoded using a color-based optical coding scheme and is to be used by the slave device to set a clock time of the slave device in accordance with the timestamp to thereby synchronize the clock time of the slave device with the clock time of the master device;

wherein the color-based optical coding scheme is implemented using a predefined color codebook according to which different timestamps are encoded by different shades of color.

20. A slave device for performing time synchronization between a master device and the slave device, the slave device comprising processing means configured to:

receive, using optical wireless signals, a timestamp representative of a clock time of the master device from the master device, wherein the timestamp is encoded using a color-based optical coding scheme, wherein the color-based optical coding scheme is implemented using a predefined color codebook according to which different timestamps are encoded by different shades of color; and set a clock time of the slave device in accordance with the timestamp to synchronize the clock time of the slave device with the clock time of the master device.

* * * * *